United States Patent
Okuno et al.

(10) Patent No.: US 9,514,894 B2
(45) Date of Patent: Dec. 6, 2016

(54) ELECTRODE ACTIVE MATERIAL FOR CAPACITOR, AND CAPACITOR USING SAID ELECTRODE ACTIVE MATERIAL

(71) Applicant: Sumitomo Electric Industries, Ltd., Osaka-shi (JP)

(72) Inventors: Kazuki Okuno, Itami (JP); Masatoshi Majima, Itami (JP); Shinji Ishikawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 116 days.

(21) Appl. No.: 14/432,161

(22) PCT Filed: Sep. 12, 2013

(86) PCT No.: PCT/JP2013/074627
§ 371 (c)(1),
(2) Date: Mar. 27, 2015

(87) PCT Pub. No.: WO2014/050579
PCT Pub. Date: Apr. 3, 2014

(65) Prior Publication Data
US 2015/0287547 A1    Oct. 8, 2015

(30) Foreign Application Priority Data

Sep. 28, 2012  (JP) .............................. 2012-217726

(51) Int. Cl.
*H01G 11/32* (2013.01)
*H01G 11/62* (2013.01)
*C01B 31/02* (2006.01)
*H01G 11/24* (2013.01)
(Continued)

(52) U.S. Cl.
CPC .............. *H01G 11/62* (2013.01); *C01B 31/02* (2013.01); *C01B 31/36* (2013.01); *H01G 11/24* (2013.01);
(Continued)

(58) Field of Classification Search
None
See application file for complete search history.

(56) References Cited

U.S. PATENT DOCUMENTS

2006/0140846 A1* 6/2006 Leis ..................... B01J 20/2808
423/445 R
2014/0287306 A1* 9/2014 Takeshi ................... C01B 31/02
429/213

FOREIGN PATENT DOCUMENTS

JP         02-184511 A       7/1990
JP       2004-513529 A       4/2004
(Continued)

OTHER PUBLICATIONS

Volker Presser et al., "Carbide-Derived Carbons—From Porous Networks to Nanotubes and Graphene," Advanced Fucntional Materials, 21, pp. 810-833 (2011).
(Continued)

*Primary Examiner* — Dion R Ferguson
(74) *Attorney, Agent, or Firm* — Venable LLP; Michael A. Sartori

(57) ABSTRACT

An electrode active material for capacitors contains a porous carbon material. The porous carbon material has a BET specific surface area of 800 m²/g or more. An X-ray diffraction image of the porous carbon material with CuKα rays has a peak $P_k$ at $2\theta=40°$ to $50°$, and the peak $P_k$ includes a component of a peak $P_{d111}$ attributed to a (111) plane of diamond crystals. When the X-ray diffraction image has a peak $P_{G002}$ attributed to a (002) plane of graphite, a ratio of an intensity $I_{G002}$ of $P_{G002}$ to an intensity $I_k$ of $P_k$ ($I_{G002}/I_k$) is 3.0 or less.

12 Claims, 10 Drawing Sheets

(51) Int. Cl.
*H01G 11/34* (2013.01)
*C01B 31/36* (2006.01)
*H01G 11/52* (2013.01)
*H01G 11/60* (2013.01)
*H01G 11/74* (2013.01)
*H01G 11/06* (2013.01)

(52) U.S. Cl.
CPC .............. *H01G 11/32* (2013.01); *H01G 11/34* (2013.01); *H01G 11/52* (2013.01); *H01G 11/60* (2013.01); *H01G 11/74* (2013.01); *H01G 11/06* (2013.01); *Y02E 60/13* (2013.01); *Y02T 10/7022* (2013.01); *Y10T 428/2982* (2015.01)

(56) References Cited

FOREIGN PATENT DOCUMENTS

| | | | |
|---|---|---|---|
| JP | 2006-513969 | A | 4/2006 |
| JP | 2008-105922 | A | 5/2008 |
| JP | 2009-200302 | A | 9/2009 |
| WO | WO-2004/094307 | A1 | 11/2004 |

OTHER PUBLICATIONS

International Search Report issued in PCT International Application No. PCT/JP2013/074627 dated Nov. 26, 2013.

\* cited by examiner

ELECTRODE ACTIVE MATERIAL FOR CAPACITOR, AND CAPACITOR USING SAID ELECTRODE ACTIVE MATERIAL

TECHNICAL FIELD

The present invention relates to an electrode active material for capacitors containing a porous carbon material, and to a capacitor that uses the electrode active material for capacitors, such as an electric double-layer capacitor (EDLC) or a lithium ion capacitor (LIC).

BACKGROUND ART

NPL 1 discloses that carbon materials having various structures, from amorphous materials to graphite, can be produced by chlorinating metal carbides. According to NPL 1, the structure and pore diameter distribution of the carbon materials generated vary in accordance with the types of metal carbides and the reaction conditions.

PTL 1 discloses that a porous carbon material obtained by chlorinating a metal carbide is used as an electrode active material for electric double-layer capacitors. Specifically, a porous carbon material having nano-order pores is generated by reacting TiC with chlorine at 900° C. to 1000° C.

CITATION LIST

Patent Literature

PTL 1: Japanese Unexamined Patent Application Publication (Translation of PCT Application) No. 2004-513529

Non Patent Literature

NPL 1: Volker Presser, Min Heon, and Yury Gogotsi, 'Carbide-Derived Carbons—From Porous Networks to Nanotubes and Graphene', ADVANCED FUNCTIONAL MATERIALS, pp. 810-833 (2011)

SUMMARY OF INVENTION

Technical Problem

As described above, a method in which a metal carbide is reacted with chlorine gas has been known as a method for generating a porous carbon material, and it has been studied that the generated porous carbon material is used as an electrode material for capacitors. However, such porous carbon materials obtained by a chlorination reaction have a variety of structures, and thus do not necessarily have an optimum structure for an electrode active material for capacitors. Therefore, it has been desired to control the fine structure of the porous carbon material so that the appropriateness of the porous carbon material as an electrode active material for capacitors can be increased as much as possible.

Solution to Problem

One aspect of the present invention relates to an electrode active material for capacitors, the electrode active material containing a porous carbon material, wherein the porous carbon material has a BET specific surface area of 800 m$^2$/g or more; an X-ray diffraction image of the porous carbon material with CuKα rays has a peak $P_k$ at 2θ=40° to 50°, and the peak $P_k$ includes a component of a peak $P_{d111}$ attributed to a (111) plane of diamond crystals; and when the X-ray diffraction image has a peak $P_{G002}$ attributed to a (002) plane of graphite, a ratio of an intensity $I_{G002}$ of $P_{G002}$ to an intensity $I_k$ of $P_k$ ($I_{G002}/I_k$) is 3.0 or less.

In the porous carbon material, $P_k$ includes a component of a peak attributed to a (111) plane of diamond crystals. Thus, the porous carbon material is believed to have a crystal structure similar to that of diamond. Herein, it is known that diamond crystals generally do not have electron conductivity. Therefore, the electron conductivity of the porous carbon material is also expected to decrease. However, the porous carbon material has excellent electron conductivity, regardless of the fact that the porous carbon material has a crystal structure similar to that of diamond. Furthermore, the electron conductivity is better than that of typical carbon materials such as graphite in terms of isotropy. Such excellent isotropy is believed to be derived from the crystal structure similar to that of diamond. In addition, the porous carbon material has excellent mechanical strength. Even if the porous carbon material has a large specific surface area of 800 m$^2$/g or more, the strength required for a capacitor material can be sufficiently maintained. Such excellent mechanical strength is also believed to be derived from the crystal structure similar to that of diamond.

$P_k$ is preferably located at an angle higher than 2θ=43°. This is because if $P_k$ is located at an angle higher than 2θ=43°, the porous carbon material is believed to contain a larger amount of diamond component.

An intensity at 2θ=10° is preferably three times or more and more preferably five times or more an intensity of $P_k$. This is because when such a peak intensity ratio is satisfied, pores of the porous carbon material are sufficiently formed, and such a porous carbon material is preferred as a carbon material for capacitors in terms of capacitance characteristics.

A size of a crystallite determined from a half peak width of $P_k$ is preferably 1.0 nm to 10.0 nm. When the size of the crystallite is 10.0 nm or less, the inherent characteristics of diamond crystals are suppressed, and better electron conductivity is believed to be achieved. When the size of the crystallite is 1.0 nm or more, better mechanical strength and better isotropy of electron conduction are believed to be achieved.

In a volume-based pore diameter distribution of the porous carbon material, a cumulative volume of pores having a pore diameter of 1 nm or less is preferably 80% or more of a total pore volume. This considerably increases the specific surface area of the porous carbon material, which is advantageous to formation of a space-charge layer.

When the porous carbon material is produced by a predetermined production method, the porous carbon material has a specific surface area of 800 m$^2$/g or more without performing an activation treatment with alkali or an activation treatment with water vapor. Since mixing of impurities derived from an activation treatment does not occur, the content of an alkali metal element in the porous carbon material can be 0 ppm to 400 ppm. Furthermore, the content of hydrogen in the porous carbon material can be 0 ppm to 100 ppm. By using a porous carbon material in which the content of an alkali metal element is 0 ppm to 400 ppm or a porous carbon material in which the content of hydrogen is 0 ppm to 100 ppm, the side reaction caused when a capacitor is charged or discharged is considerably suppressed.

Another aspect of the present invention relates to a capacitor including a first electrode, a second electrode, a separator disposed between the first electrode and the second electrode, and an electrolyte, wherein at least one of the first electrode and the second electrode contains the above-described electrode active material for capacitors. Such a capacitor has a low electrical resistance and excellent cycle characteristics because the capacitor contains, as an active material, a porous carbon material having excellent electron conductivity, excellent isotropy of electron conduction, and excellent mechanical strength.

The electrolyte of the capacitor preferably contains, as a cation, at least one selected from the group consisting of a lithium ion ($Li^+$), a tetraethylammonium ion ($TEA^+$), a triethylmonomethylammonium ion ($TEMA^+$), a 1-ethyl-3-methyl imidazolium ion ($EMI^+$), and an N-methyl-N-propyl pyrrolidinium ion ($MPPY^+$) and contains, as an anion, at least one selected from the group consisting of a hexafluorophosphate ion ($PF_6^-$), a perchlorate ion ($ClO_4^-$), a tetrafluoroborate ion ($BF_4^-$), a bis(oxalato)borate ion ($BC_4O_8^-$), a bis(fluorosulfonyl)imide ion ($N(SO_2F)_2^-$), a bis(trifluoromethanesulfonyl)imide ion ($N(SO_2CF_3)_2^-$), a bis(pentafluoroethanesulfonyl)imide ion ($N(SO_2C_2F_5)_2^-$), and a trifluoromethanesulfonate ion ($CF_3SO_3^-$). Such an electrolyte has excellent ionic conductivity and excellent permeability into an electrode, and thus improves the characteristics of the capacitor.

When the capacitor is a lithium ion capacitor including a positive electrode, a negative electrode, a separator disposed between the positive electrode and the negative electrode, and a lithium ion conductive nonaqueous electrolyte, the nonaqueous electrolyte contains a nonaqueous solvent and a lithium salt soluble in the nonaqueous solvent, and the nonaqueous solvent is an ionic liquid or an organic solvent. The ionic liquid preferably contains, as a cation, at least one selected from the group consisting of a 1-ethyl-3-methyl imidazolium ion ($EMI^+$) and an N-methyl-N-propyl pyrrolidinium ion ($MPPY^+$) and contains, as an anion, at least one selected from the group consisting of a bis(fluorosulfonyl)imide ion ($N(SO_2F)_2^-$, a bis(trifluoromethanesulfonyl)imide ion ($N(SO_2CF_3)_2^-$, a bis(pentafluoroethanesulfonyl)imide ion ($N(SO_2C_2F_5)_2^-$), and a trifluoromethanesulfonate ion ($CF_3SO_3^-$). Such a nonaqueous electrolyte particularly has excellent ionic conductivity and excellent permeability into an electrode.

Advantageous Effects of Invention

Use of the electrode active material for capacitors according to the present invention can provide a capacitor having a low resistance and excellent cycle characteristics.

DESCRIPTION OF EMBODIMENTS

Electrode Active Material for Capacitor

First, an electrode active material for capacitors will be described.

An electrode active material for capacitors according to the present invention contains a porous carbon material. Herein, the X-ray diffraction image of the porous carbon material with CuKα rays has a peak $P_{d111}$ attributed to a (111) plane of diamond crystals. Such a porous carbon material is believed to at least partly have a crystal structure similar to that of diamond, and has better isotropy of electron conduction than graphite or the like in terms of electron conductivity. Therefore, such a porous carbon material can provide a capacitor having a low electrical resistance and excellent current-collecting performance. The presence of a diamond structure can achieve a potential window wider than that of graphite and amorphous carbon, which may also provide an effect of suppressing the degradation of electrodes due to an increase in voltage. Although the porous carbon material with an X-ray diffraction image having $P_{d111}$ has a considerably large specific surface area, the mechanical strength can be maintained for a long time. Therefore, a capacitor having a high capacitance and excellent cycle characteristics can be provided.

Specifically, the X-ray diffraction image of the porous carbon material has a peak $P_k$ at $2\theta=40°$ to $50°$, and the peak $P_k$ includes a component of a peak $P_{d111}$ attributed to a (111) plane of diamond crystals. Herein, all components of $P_k$ may be components attributed to the (111) plane of diamond crystals. That is, the relationship $P_k=P_{d111}$ may be satisfied.

When the porous carbon material contains a graphite component, a peak $P_{G010}$ attributed to a (010) plane of graphite appears at 2θ=40° to 50°, which is the range that overlaps $P_{111}$. In this case, a peak $P_{G002}$ attributed to a (002) plane of graphite is simultaneously observed at 2θ=20° to 30°. Herein, the position of $P_k$ is sometimes 2θ<43°.

Accordingly, when the X-ray diffraction image with CuKα rays has a peak $P_{G002}$ attributed to the (002) plane of graphite, the peak $P_k$ at 2θ=40° to 50° is a peak obtained by combining $P_{G010}$ and $P_{d111}$. Even in such a case, when the ratio of the intensity $I_{G002}$ of $P_{G002}$ to the intensity $I_k$ of $P_k$ ($I_{G002}/I_k$) is 3.0 or less, $I_k$ is much higher than $I_{G002}$ and thus $P_k$ includes at least the component of $P_{d111}$.

Figure 1:
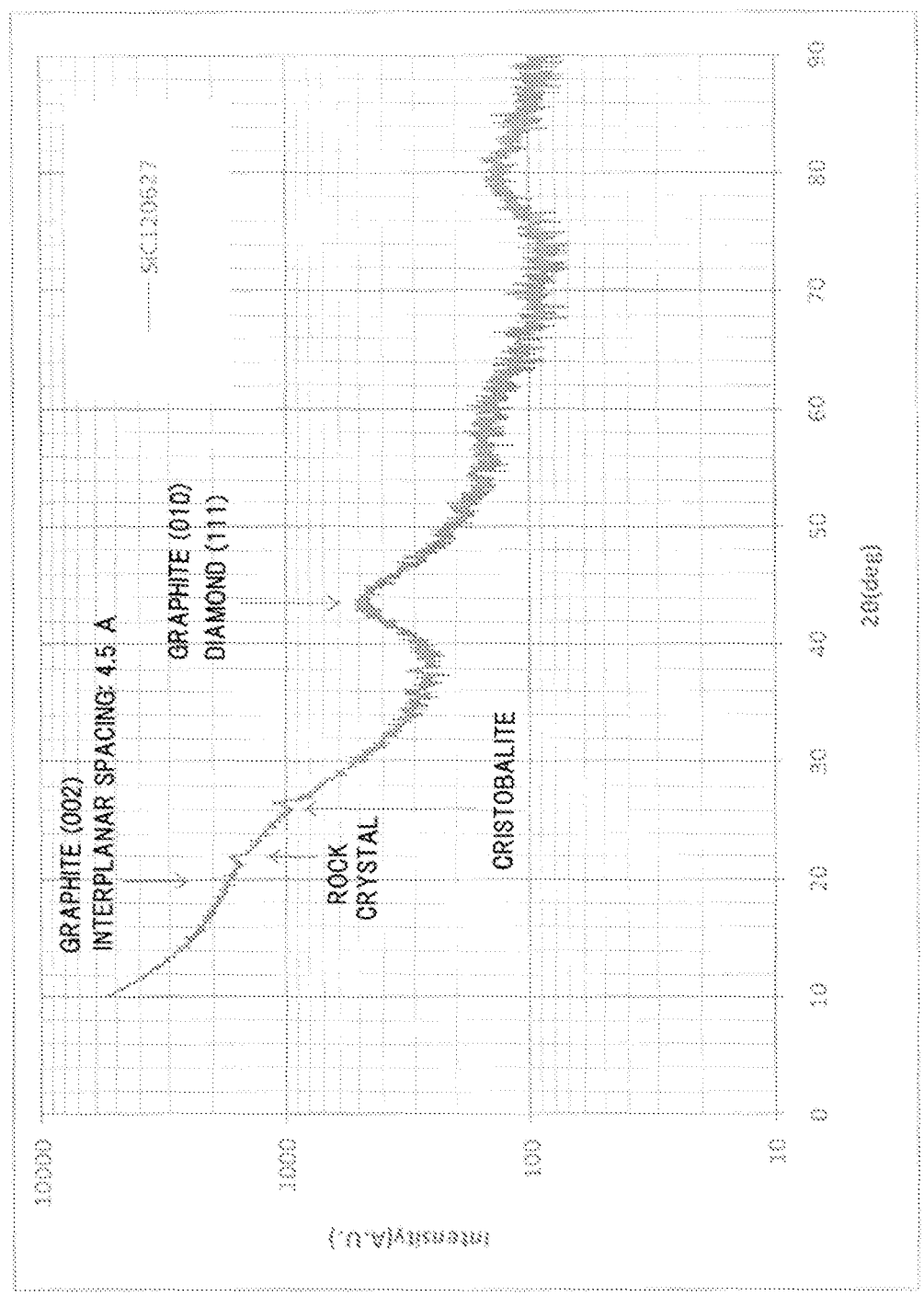
FIG. 1 illustrates an X-ray diffraction image (waveform X) of an example of a porous carbon material generated by reacting silicon carbide (SiC) with chlorine gas, the X-ray diffraction image having a peak attributed to a (111) plane of diamond crystals.

The ratio $I_{G002}/I_k$ is preferably 3.0 or less and more preferably 2.5 or less. In the case where such a peak intensity ratio is satisfied, even if the porous carbon material includes a graphite component, typical characteristics of graphite are substantially not exhibited, but characteristics based on a crystal structure similar to that of diamond are strongly exhibited. Note that the intensity (I) of each peak is the height from the baseline of the X-ray diffraction image. The baseline indicates background noise signals. In FIG. 1, for example, the baseline around 2θ=44° is obtained by drawing a straight line between the intensity at 2θ=35° and the intensity at 2θ=55°. Since a baseline cannot be drawn at 2θ=10°, it is assumed that the height of the baseline is zero and the peak intensity is the intensity of X-ray diffraction.

The position of the peak attributed to the (002) plane of graphite is 2θ≅42.7° whereas the position of the peak attributed to the (111) plane of diamond is 2θ≅43.9°. This suggests that the amount of the component attributed to the (111) plane of diamond increases as the angle at which $P_k$ appears increases. Therefore, when the angle 2θ at which $P_k$ appears is higher than 43°, the porous carbon material is believed to include a larger amount of a diamond component.

FIG. 1 illustrates an X-ray diffraction image of an example of a porous carbon material having $P_{d111}$. In FIG. 1, a broad peak $P_k$ attributed to the (111) plane of diamond crystals appears at 2θ=40° to 50°. The angle at which the peak $P_k$ appears is substantially the same as the angle at which the peak attributed to the (010) plane of graphite appears, but when graphite is present, the peak $P_{G002}$ attributed to the (002) plane of graphite is also simultaneously observed at 2θ=20° to 30°. In FIG. 1, $P_{G002}$ is not observed at 2θ=20° to 30° and the position of $P_k$ is 2θ=43.8°. This shows that the broad peak at 2θ=40° to 50° is the peak $P_{d111}$ attributed to the (111) plane of diamond crystals. Herein, the position 2θ of $P_k$ is an average of two angles at which the intensity is half the peak intensity (intensity at the top).

In FIG. 1, the intensity $I_{10}$ at a diffraction angle of 2θ=10° is about ten times the intensity $I_k$ of the peak at 2θ=40° to 50°. The diffraction angle 2θ=10° indicates a structure with a size of 0.8 nm to 0.9 nm, which means that the carbon material has porosity. It is believed that the number of pores formed increases as the diffraction intensity at 2θ=10° increases. The ratio of $I_{10}$ to $I_k$ ($I_{10}/I_k$) is preferably 3.0 or more and more preferably 5.0 or more. When such a peak intensity ratio is satisfied, pores of the porous carbon material are sufficiently formed, and such a porous carbon material is preferred as a carbon material for capacitors in terms of capacitance characteristics.

Herein, the appearance of the peak $P_{d111}$ attributed to the (111) plane of diamond crystals is not necessarily equivalent to containing diamond crystals in the porous carbon material. However, the presence of the peak $P_{d111}$ at least indicates the presence of a crystal structure similar to that of diamond.

The size of a crystallite (i.e., a crystallite constituting a crystal similar to that of diamond) determined from the half peak width of $P_k$ is, for example, desirably 1.0 nm to 10.0 nm. The structure of the crystallite can be confirmed by observing a section of the porous carbon material with an electron microscope. As the size of the crystallite increases, the porous carbon material tends to have stronger characteristics similar to those of diamond and the specific surface area of the porous carbon material tends to decrease. Therefore, the size of the crystallite is preferably 1.0 nm to 5.0 nm and more preferably 1.0 nm to 3.0 nm.

Figure 2:
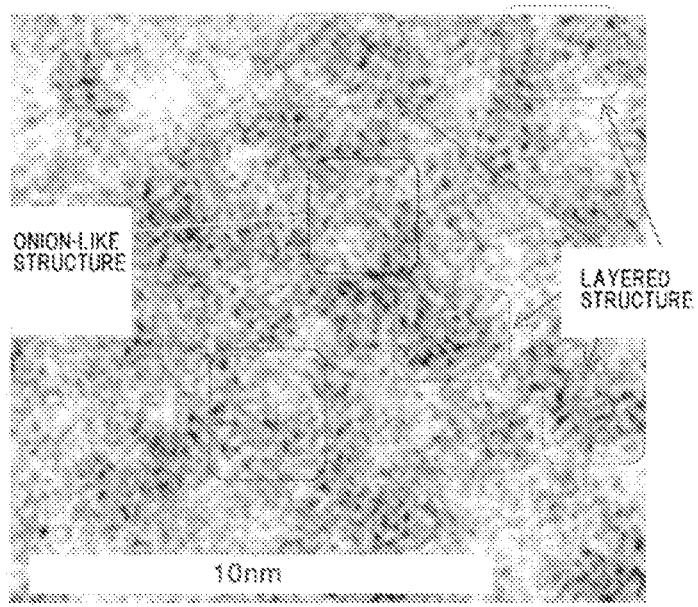
FIG. 2 is an electron micrograph of the porous carbon material and illustrates carbon microcrystals having a layered structure or an onion-like structure.

FIG. 2 is an electron micrograph of an example of a porous carbon material in which the X-ray diffraction image with CuKα rays has $P_{d111}$. In FIG. 2, the presence of carbon microcrystals having a layered structure or an onion-like structure can be confirmed. The grain size of the carbon microcrystals is about 2 nm. When the porous carbon material contains carbon microcrystals with an onion-like structure as illustrated in FIG. 2, it is believed that the porous carbon material strongly exhibits characteristics similar to those of diamond. Therefore, although the details are still unclear, the carbon microcrystals with an onion-like structure are assumed to be attributed to crystals similar to diamond crystals. As described above, the porous carbon material is not completely amorphous, but contains carbon microcrystals having a size of less than 10 nm.

In the volume-based pore diameter distribution of the porous carbon material, the cumulative volume of pores having a pore diameter of 1 nm or less is preferably 80% or more of the total pore volume and more preferably 90% or more of the total pore volume. As described above, most of the pores of the porous carbon material are micropores having a pore diameter of 1 nm or less. Small proportions of mesopores (pore diameter: 2 nm to 50 nm) and macropores (pore diameter: more than 50 nm) considerably increase the specific surface area of the porous carbon material and also increase the ratio of an area in which a space-charge layer is formed. Thus, an electrode for capacitors having a high capacitance is provided.

The amount of impurities in the porous carbon material is preferably small. This is because impurities cause the internal short-circuit of the capacitor, the degradation of cycle characteristics, an increase in the internal pressure due to gas generation, and the like. Examples of impurities possibly contained in the electrode active material for capacitors include alkali metal elements, surface functional groups, and transition metal elements.

Alkali metal elements cause a side reaction during charging, and thus degrade the cycle characteristics of the capacitor. Therefore, the porous carbon material desirably does not contain alkali metal elements. Even if such alkali metal elements are contained as impurities, the content (mass) of the alkali metal elements in the porous carbon material is preferably 400 ppm or less, more preferably 100 ppm or less, and particularly preferably 10 ppm or less. Examples of the alkali metal elements possibly contained as impurities include lithium, sodium, potassium, and cesium.

Surface functional groups are functional groups that can be present at a surface of the porous carbon material. Such a functional group is normally a hydroxy group, a carboxy group, an alkyl group, or the like, which contains a hydrogen atom. The surface functional group easily causes a side reaction with an electrolyte in the capacitor. As a result of the side reaction, gas is generated in the capacitor, which degrades the cycle characteristics of the capacitor. Therefore, the content (mass) of hydrogen in the porous carbon material is preferably 0 ppm to 100 ppm and more preferably 50 ppm or less.

Transition metal elements may cause the internal short-circuit of the capacitor, and thus the porous carbon material desirably does not contain transition metal elements. Such a transition metal element may be contained in a raw material (e.g., metal carbide) for the porous carbon material. However, the concentration of the transition metal element can be sufficiently decreased by controlling the conditions under which the porous carbon material is generated. The content (mass) of the transition metal element in the porous carbon material is preferably 100 ppm or less and more preferably 10 ppm or less.

The BET specific surface area of the porous carbon material may be, for example, 800 $m^2/g$ or more, but is preferably 1000 $m^2/g$ or more, more preferably 1100 $m^2/g$ or more, further preferably 1200 $m^2/g$ or more, and particularly preferably 1300 $m^2/g$ or more to obtain an electrode for capacitors having a high capacitance. The BET specific surface area of the porous carbon material is, for example, 2500 $m^2/g$ or less and is generally 2000 $m^2/g$ or less. If the BET specific surface area is 1800 $m^2/g$ or less, the production is more easily performed. The upper limit and the lower limit can be freely combined with each other. That is, the preferable range of the BET specific surface area of the porous carbon material may be, for example, 1000 $m^2/g$ to 2000 $m^2/g$ or 1100 $m^2/g$ to 1800 $m^2/g$.

The porous carbon material having the above-described characteristics can be generated, for example, by heating a metal carbide with an average particle diameter of 0.1 μm to 100 μm, preferably a metal carbide with an average particle diameter of 2 μm to 40 μm, at 1100° C. or higher and 1500° C. or lower in an atmosphere containing chlorine gas. The average particle diameter refers to a particle diameter (D50) at which the cumulative volume reaches 50% in the volume-based particle size distribution. Hereafter, the same applies to other materials. By using a metal carbide having an average particle diameter in the above range in the form of powder or a porous body, the porous carbon material can be efficiently generated from the metal carbide. Furthermore, the time required to produce the porous carbon material can be shortened. Note that the porous body is in a state in which particles constituting a powder are bonded to each other by aggregation or sintering.

As a result of the reaction of the metal carbide with chlorine gas, a porous carbon material and a metal chloride are generated. Herein, for example, when silicon carbide (SiC) or titanium carbide (TiC) is selected as the metal carbide and the heating temperature is set to be 1100° C. or higher and preferably 1200° C. or higher, a porous carbon material in which the X-ray diffraction image with CuKα rays has $P_{d111}$ is generated. If the heating temperature is excessively increased, the specific surface area of the porous carbon material generated tends to decrease. Therefore, the heating temperature is preferably 1500° C. or lower and more preferably 1400° C. or lower.

As described above, the porous carbon material generated by heating the metal carbide at the predetermined temperature in an atmosphere containing chlorine gas has a sharp pore diameter distribution in which the cumulative volume of pores having a pore diameter of 1 nm or less is 80% or more or 90% or more of the total pore volume. Furthermore, a large specific surface area is achieved, which is advantageous to formation of a space-charge layer. Moreover, the metal carbide itself used as a raw material is a material not readily containing impurities. Thus, a high-purity porous carbon material is generated, and the content of the impurities is considerably low. Therefore, there can be easily provided a porous carbon material containing 10 ppm or less of an alkali metal element, 50 ppm or less of hydrogen, and 10 ppm or less of a transition metal element.

At least one selected from the group consisting of SiC and TiC is preferably used as the metal carbide reacted with chlorine gas so that the porous carbon material generated easily exhibits characteristics similar to those of diamond. Among them, SiC is particularly used. As a result, a porous carbon material having better isotropy of electron conduction and weaker characteristics of graphite can be obtained.

FIG. 1, which has been referred to earlier, illustrates an X-ray diffraction image of a porous carbon material generated by reacting SiC with chlorine gas at 1100° C. FIG. 2 is an electron micrograph taken with a transmission electron microscope (TEM) and shows a section of the porous carbon material. In FIG. 1, peaks attributed to graphite are not observed at all.

In FIG. 1, a peak that appears around $2\theta=22°$ is attributed to rock crystal and a peak that appears around $2\theta=26°$ is attributed to cristobalite. They are derived from silica contained in SiC as an impurity. Herein, rock crystal and cristobalite are stable in the capacitor and do not cause a side reaction. Therefore, there is almost no need to restrict the contents of rock crystal and cristobalite. When silica is used as a raw material for SiC, silica is merely left in SiC and silica is not necessarily contained in SiC.

Figure 3:
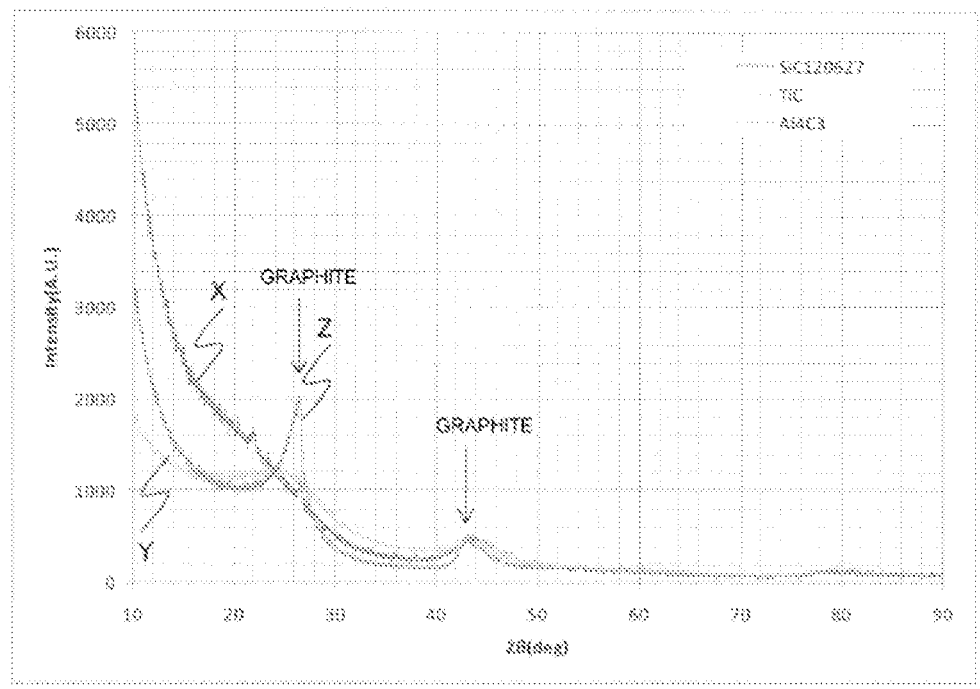
FIG. 3 illustrates an X-ray diffraction image (waveform Y) of a porous carbon material generated by reacting titanium carbide (TiC) with chlorine gas and an X-ray diffraction image (waveform Z) of a porous carbon material generated by reacting aluminum carbide ($Al_4C_3$) with chlorine gas, together with the waveform X for comparison.

FIG. 3 illustrates an X-ray diffraction image (waveform Y) of a porous carbon material generated by reacting TiC with chlorine gas at 1000° C. and an X-ray diffraction image (waveform Z) of a porous carbon material generated by reacting $Al_4C_3$ with chlorine gas at 1000° C., together with the X-ray diffraction image (waveform X) illustrated in FIG. 1 for comparison.

Referring to FIG. 3, when $Al_4C_3$ is used as a metal carbide, a broad peak $P_{kz}$ is observed at $2\theta=40°$ to 50° and also a relatively sharp peak is observed at $2\theta=20°$ to 30°. The relatively sharp peak at $2\theta=20°$ to 30° is a peak $P_{G002}$ attributed to a (002) plane of graphite. The ratio of the intensity $I_{G002}$ of $P_{G002}$ to the intensity $I_{kz}$ of $P_{kz}$ ($I_{G002}/I_{kz}$) is 4.4. In this case, since the intensity $I_{G002}$ is considerably high, $P_{kz}$ is believed to be practically attributed to a (010) plane of graphite. Furthermore, even if $P_{kz}$ slightly includes a component of $P_{d111}$ attributed to the (111) plane of diamond crystals, characteristics derived from a crystal structure similar to that of diamond are hardly exhibited.

When TiC is used as a metal carbide, a broad peak $P_{ky}$ is observed at $2\theta=40°$ to 50° and a broad peak $P_{G002}$ attributed to a (002) plane of graphite is observed at $2\theta=20°$ to 30°. Herein, $P_{G002}$ is a broad peak and the ratio of the intensity $I_{G002}$ of $P_{G002}$ to the intensity $I_{ky}$ of $P_{ky}$ ($I_{G002}/I_{ky}$) is 2.7, and thus characteristics of graphite are suppressed. Therefore, a large proportion of $P_{ky}$ at $2\theta=40°$ to 50° is presumed to be a component of $P_{d111}$ attributed to the (111) plane of diamond crystals.

When $Al_4C_3$ is used as a metal carbide, the intensity $I_{10}$ at $2\theta=10°$ is about eight times the intensity $I_k$ of a peak at $2\theta=40°$ to 50°. When TiC is used as a metal carbide, the intensity $I_{10}$ at $2\theta=10°$ is about four times the intensity $I_k$ of a peak at $2\theta=40°$ to 50°. When SiC is used as a metal carbide, the intensity $I_{10}$ at $2\theta=10°$ is about ten times the intensity $I_k$ of a peak at $2\theta=40°$ to 50°. Therefore, it can be said that pores of the porous carbon material are developed most when SiC is used as a metal carbide.

Figure 14:
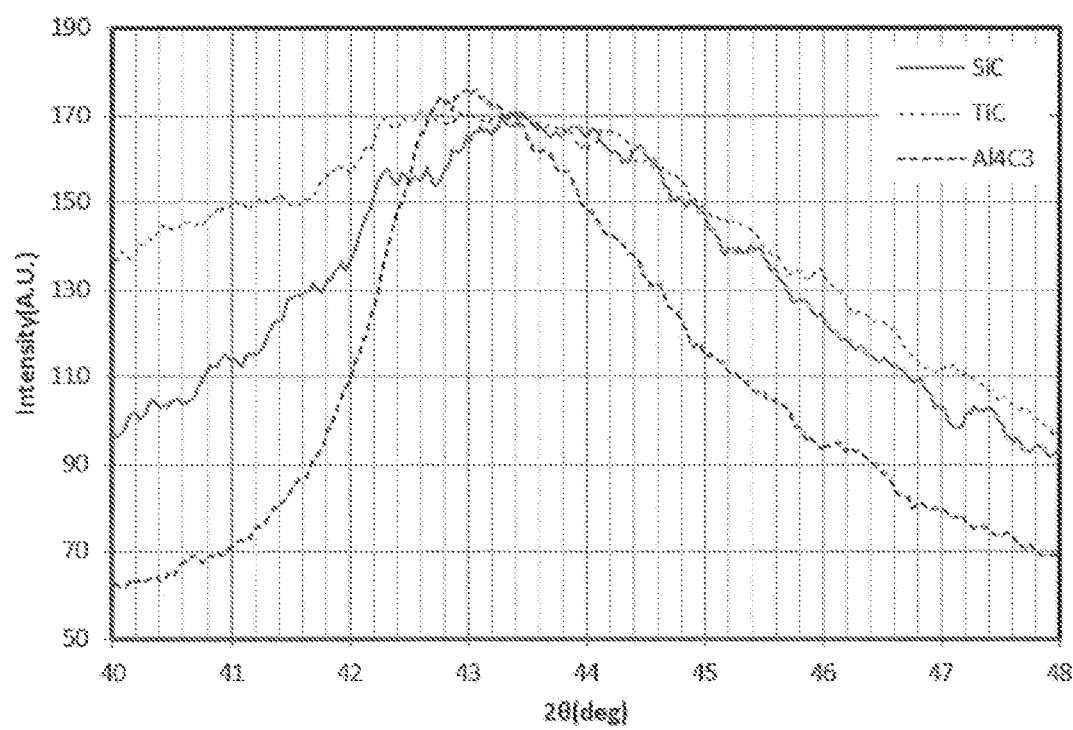
FIG. 14 is a graph in which a range of $2\theta=40°$ to $48°$ in FIG. 3 is enlarged.

FIG. 14 is a graph in which a range of 2θ=40° to 50° in FIG. 3 is enlarged. It is clearly found that the porous carbon material generated by reacting SiC with chlorine gas at 1100° C. has a peak located at the highest angle, that is, at 2θ=more than 43°. Therefore, it can be said that the porous carbon material that uses SiC as a metal carbide includes a larger amount of diamond component than the porous carbon material that uses Al₄C₃ or TiC as a metal carbide.

Next, a heating temperature at which the metal carbide is reacted with chlorine gas will be described.

Figure 4:
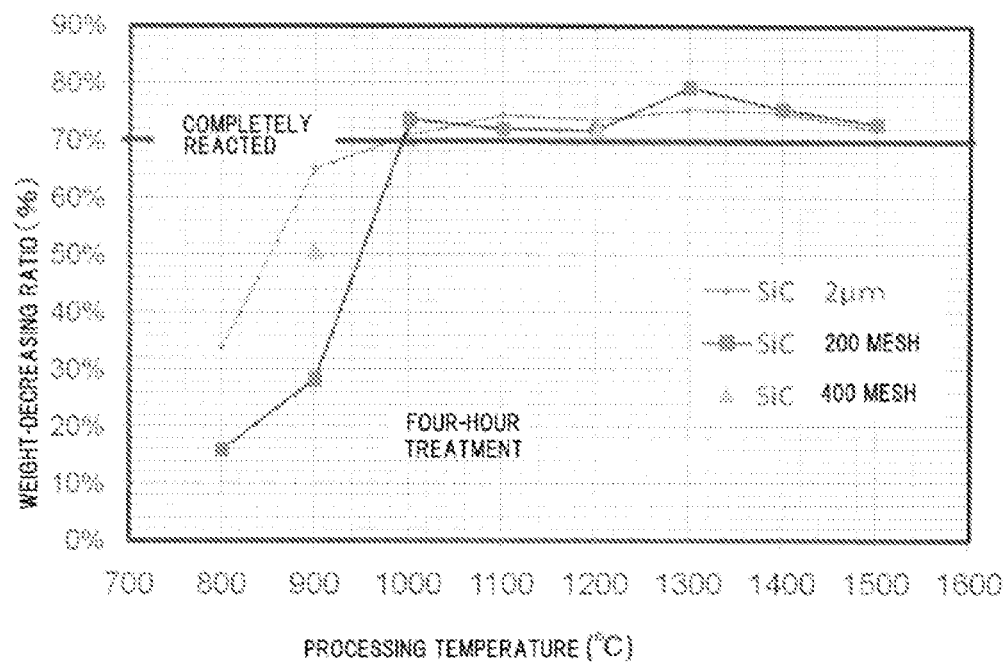
FIG. 4 illustrates the relationship between the heating temperature at which silicon carbide is reacted with chlorine gas and the weight-decreasing ratio of the silicon carbide.

FIG. 4 illustrates the relationship between the heating temperature (processing temperature) at which the silicon carbide is reacted with chlorine gas and the weight-decreasing ratio of the metal carbide. The reaction formula of silicon carbide and chlorine gas is as follows.

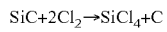

$$SiC+2Cl_2 \rightarrow SiCl_4+C$$

The molecular weight of SiC is about 40 and the atomic weight of carbon is 12. If the above reaction completely proceeds, the mass of SiC serving as a raw material decreases by about 70%. It can be understood from FIG. 4 that, regardless of the particle diameter of SiC serving as a raw material, the reaction almost completely proceeds by heating silicon carbide in an atmosphere containing chlorine gas at 1000° C. for 4 hours or longer. The concentration of the chlorine gas in the atmosphere containing chlorine gas is 9 mol % and the rest is nitrogen gas.

As described above, when SiC is used as a raw material, the heating temperature may be 1000° C. or less for the purpose of only causing the chlorination reaction to proceed. However, a porous carbon material in which the X-ray diffraction image with CuKα rays has a peak $P_{d111}$ attributed to the (111) plane of diamond crystals is generated by setting the heating temperature to 1100° C. or higher.

Figure 5:
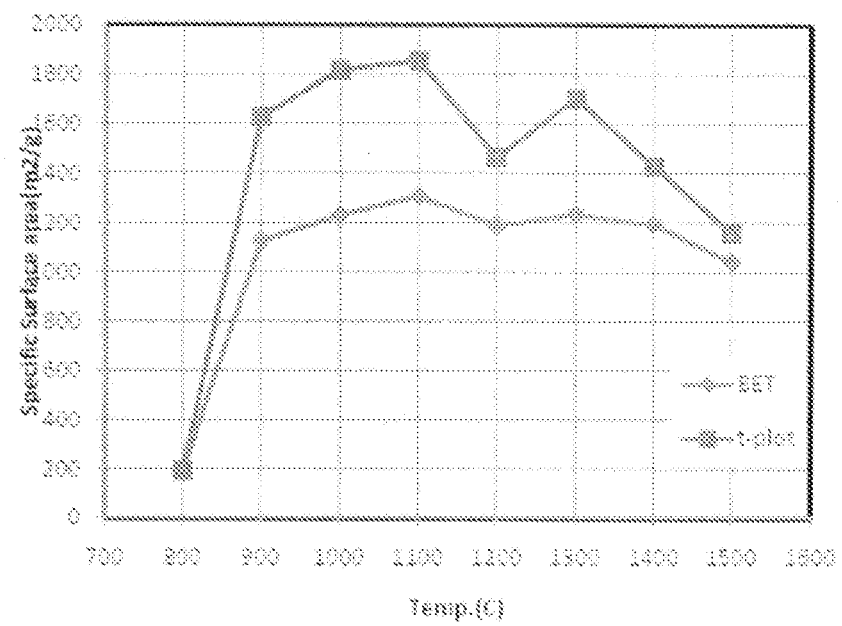
FIG. 5 illustrates the relationship between the heating temperature at which silicon carbide is reacted with chlorine gas and the specific surface area (a BET method and t-plot by a Langmuir method) of the porous carbon material generated.

FIG. 5 illustrates the relationship between the heating temperature (Temp.) at which silicon carbide is reacted with chlorine gas and the specific surface area of the porous carbon material generated in terms of a BET method and t-plot by a Langmuir method. Referring to FIG. 5, the reaction temperature may be about 900° C. for the purpose of only generating a porous carbon material having a large specific surface area. It can also be understood that the specific surface area tends to decrease to some degree as the heating temperature increases.

Figure 6:
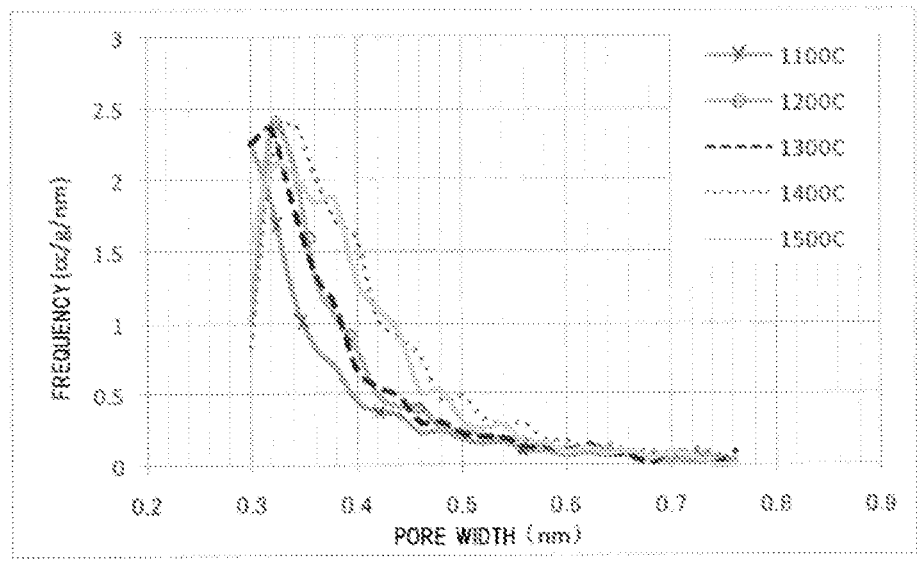
FIG. 6 illustrates the relationship between the heating temperature at which silicon carbide is reacted with chlorine gas and the pore diameter distribution of the porous carbon material generated.

FIG. 6 illustrates the relationship between the heating temperature at which silicon carbide is reacted with chlorine gas and the pore diameter distribution of the porous carbon material generated (frequency-pore width characteristic diagram). Referring to FIG. 6, as the heating temperature increases, peaks in the distribution slightly shift in a direction in which the pore diameter increases. This corresponds to the fact that the specific surface area tends to decrease as the heating temperature increases.

Figure 7:
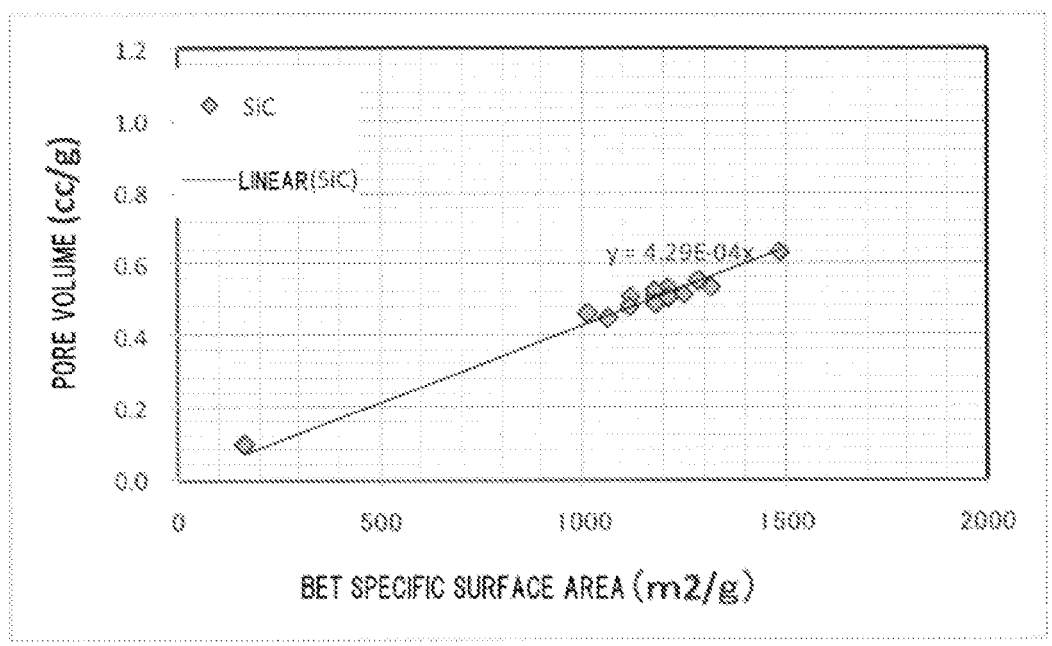
FIG. 7 illustrates the relationship between the total pore volume of the porous carbon material generated by reacting silicon carbide with chlorine gas and the BET specific surface area.

FIG. 7 illustrates the relationship between the total pore volume (g/cc=g/cm³) of the porous carbon material generated by reacting silicon carbide with chlorine gas and the BET specific surface area. FIG. 7 shows that the total pore volume increases as the BET specific surface area increases. The porous carbon material is suitable as an electrode active material for capacitors when the BET specific surface area is large and the pore volume is large. Therefore, the heating temperature at which the metal carbide is chlorinated is preferably set to a temperature (e.g., 1400° C. or lower) at which the BET specific surface area does not considerably decrease.

Figure 8:
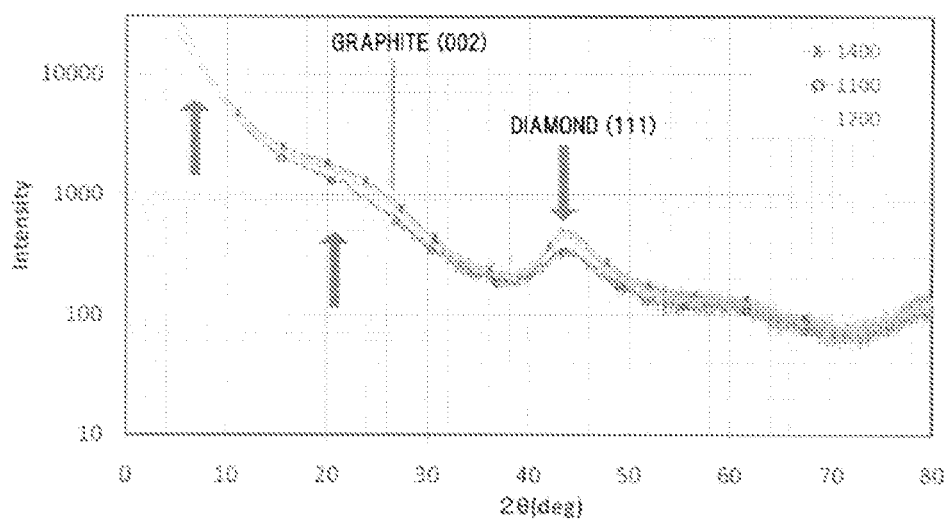
FIG. 8 is a graph illustrated so that the X-ray diffraction images of porous carbon materials generated by reacting silicon carbide with chlorine gas at 1100° C., 1200° C., and 1400° C. are compared with each other.

FIG. 8 is a graph illustrated so that the X-ray diffraction images of porous carbon materials generated by reacting silicon carbide with chlorine gas at 1100° C., 1200° C., and 1400° C. can be compared with each other. FIG. 8 shows that none of the porous carbon materials generated at 1100° C. to 1400° C. has a peak $P_{G002}$ attributed to the (002) plane of graphite, but all of them have a peak $P_{d111}$ attributed to the (111) plane of diamond crystals. Note that the intensity $I_{d111}$ of $P_{d111}$ tends to increase as the heating temperature increases. This corresponds to the fact that the size of the carbon microcrystals tends to increase as the heating temperature is excessively increased.

Also in the X-ray diffraction image illustrated in FIG. 8, the intensity $I_{10}$ at 2θ=10° of the porous carbon materials generated by reacting silicon carbide with chlorine gas at 1100° C., 1200° C., and 1400° C. is ten times or more the intensity $I_k$ of a peak at 2θ=40° to 50°.

[Capacitor]

Next, a capacitor containing the porous carbon material as an electrode active material will be described.

The above-described porous carbon material is suitable as an electrode active material for, for example, an electric double-layer capacitor (EDLC) or a lithium ion capacitor (LIC). Therefore, an EDLC and an LIC will be described hereafter, but the types of capacitors to which the porous carbon material can be applied are not particularly limited.

[Electric Double-Layer Capacitor (EDLC)]

An EDLC includes a first electrode, a second electrode, a separator disposed between the first electrode and the second electrode, and an electrolyte. At least one of the first electrode and the second electrode contains the above-described porous carbon material as an electrode active material for capacitors. In the EDLC, the first electrode and the second electrode generally have the same structure.

[Lithium Ion Capacitor (LIC)]

An LIC includes a positive electrode, a negative electrode, a separator disposed between the positive electrode and the negative electrode, and a lithium ion conductive nonaqueous electrolyte. At least one of the positive electrode and the negative electrode contains the above-described porous carbon material as a positive electrode active material or a negative electrode active material. In the LIC, the positive electrode and the negative electrode generally have different structures. For example, the above-described porous carbon material is used as a positive electrode active material. A material capable of occluding and desorbing lithium ions, a material capable of forming an alloy with lithium ions, or the like is used as a negative electrode active material.

[Electrode for Capacitor]

An electrode includes an electrode active material and an electrode current collector that holds the electrode active material.

The electrode current collector may be a metal foil, but is preferably a metal porous body having a three-dimensional network structure in view of producing a capacitor having a high capacitance. The metal porous body used for the positive electrode for LICs or a polarized electrode for EDLCs is preferably made of aluminum, an aluminum alloy, or the like. The metal porous body used for the negative electrode for LICs is preferably made of copper, a copper alloy, nickel, a nickel alloy, stainless steel, or the like.

The electrode for capacitors is obtained by coating or filling an electrode current collector with a slurry containing an electrode active material (porous carbon material), then removing a dispersion medium contained in the slurry, and optionally rolling the current collector that holds the electrode active material. The slurry may contain a binder and a conductive aid, in addition to the electrode active material.

Examples of the dispersion medium include N-methyl-2-pyrrolidone (NMP) and water.

Non-limiting examples of the binder include polyvinylidene fluoride, polytetrafluoroethylene, polyvinylpyrrolidone, polyvinyl chloride, polyolefin, styrene-butadiene rubber, polyvinyl alcohol, and carboxymethyl cellulose. The amount of the binder is not particularly limited, but is, for example, 0.5 to 10 parts by mass relative to 100 parts by mass of the electrode active material.

Non-limiting examples of the conductive aid include acetylene black, Ketjenblack, and carbon fiber. The amount of the conductive aid is not particularly limited, but is, for example, 0.1 to 10 parts by mass relative to 100 parts by mass of the electrode active material.

Activated carbon is generally used as the electrode active material for capacitors, and such activated carbon is subjected to an activation treatment. The activation treatment is generally performed by a gas activation method or a chemical activation method. In the gas activation method, a carbon material is brought into contact with water vapor, carbon dioxide, oxygen, or the like at high temperature. In the chemical activation method, a carbon material is impregnated with an activator and heated in an inert gas atmosphere. An example of the activator is potassium hydroxide. Therefore, the activated carbon contains many impurities. On the other hand, the porous carbon material generated by chlorinating a metal carbide contains almost no impurities as described above.

In addition to the porous carbon material, lithium titanate, silicon oxide, a silicon alloy, tin oxide, a tin alloy, graphite, or the like can also be used as the negative electrode active material for LICs.

The negative electrode active material for LICs is preferably doped with lithium in advance to decrease the negative electrode potential. This increases the voltage of the capacitor, which is advantageous to an increase in the capacitance of the LIC. The doping with lithium is performed during the fabrication of a capacitor. For example, a lithium metal foil is accommodated in a capacitor container together with a positive electrode, a negative electrode, and a nonaqueous electrolyte, and the fabricated capacitor is kept warm in a thermostatic chamber at about 60° C. As a result, lithium ions are eluted from a lithium metal foil and occluded in the negative electrode active material. The negative electrode active material is doped with lithium in such an amount that preferably 5% to 90% and more preferably 10% to 75% of the negative electrode capacitance (Cn) is filled with lithium. This sufficiently decreases the negative electrode potential, and a high-voltage capacitor is easily produced.

The electrolyte of the capacitor contains cations and anions.

Such cations are preferably lithium ions ($Li^+$), tetraalkylphosphonium ions, tetraalkylammonium ions (e.g., tetraethylammonium ions ($TEA^+$), triethylmonomethylammonium ions ($TEMA^+$)), heterocyclic compound ions (ions having an imidazolium skeleton, an imidazolinium skeleton, a pyridinium skeleton, a pyrrolidinium skeleton, or the like (e.g., 1-ethyl-3-methyl imidazolium ions ($EMI^+$), N-methyl-N-propyl pyrrolidinium ions ($MPPY^+$))), or the like. These cations may be used alone or in combination of two or more. The alkyl group contained in ammonium ions or the like is preferably a group having 4 or less carbon atoms.

Such anions are preferably hexafluorophosphate ions ($PF_6^-$), perchlorate ions ($ClO_4^-$), tetrafluoroborate ions ($BF_4^-$), bis(oxalato)borate ions ($BC_4O_8^-$), bis(fluorosulfonyl)imide ions ($N(SO_2F)_2^-$), bis(trifluoromethanesulfonyl)imide ions ($N(SO_2CF_3)_2^-$), bis(pentafluoroethanesulfonyl)imide ions ($N(SO_2C_2F_5)_2^-$), trifluoromethanesulfonate ions ($CF_3SO_3^-$), or the like. These anions may be used alone or in combination of two or more.

The electrolyte used for EDLCs may be an alkali electrolyte or a nonaqueous electrolyte. Examples of the alkali electrolyte include aqueous alkali solutions such as an aqueous potassium hydroxide solution and an aqueous sodium hydroxide solution. The nonaqueous electrolyte is preferably a nonaqueous solvent prepared by dissolving, for example, a salt of an onium ion (cation) selected from the foregoing and a borate ion (anion). The concentration of the salt in the nonaqueous electrolyte may be, for example, 0.3 mol/L to 3 mol/L.

Non-limiting examples of the nonaqueous solvent used for EDLCs include sulfolane, ethylene carbonate, propylene carbonate, butylene carbonate, dimethyl carbonate, diethyl carbonate, ethyl methyl carbonate, and acetonitrile. They may be used alone or in combination of two or more.

The onium ions used for EDLCs are preferably tetraalkylammonium ions or tetraalkylphosphonium ions with an alkyl group having four or less carbon atoms, and particularly preferably triethylmonomethylammonium ions ($TEMA^+$) because such onium ions can impart excellent ionic conductivity to the electrolyte. The borate ions are preferably tetrafluoroborate ions ($BF_4^-$). Therefore, a specific example of a preferred salt is a salt of $TEMA^+$ and $BF_4^-$ ($TEMA$-$BF_4$).

The nonaqueous electrolyte used for LICs is preferably a nonaqueous solvent prepared by dissolving a lithium salt. The concentration of the lithium salt in the nonaqueous electrolyte may be, for example, 0.3 mol/L to 3 mol/L. The lithium salt is not particularly limited, but is preferably $LiClO_4$, $LiBF_4$, $LiPF_6$, lithium bis(fluorosulfonyl)imide, lithium bis(trifluoromethanesulfonyl)imide, or lithium bis(pentafluoroethanesulfonyl)imide. They may be used alone or in combination of two or more.

Non-limiting examples of the organic solvent used for LICs in terms of ionic conductance include cyclic carbonates such as ethylene carbonate, propylene carbonate, and butylene carbonate; chain carbonates such as dimethyl carbonate, diethyl carbonate, and ethyl methyl carbonate; aliphatic carboxylate such as methyl formate, methyl acetate, methyl propionate, and ethyl propionate; lactones such as γ-butyrolactone and γ-valerolactone; chain ethers such as 1,2-dimethoxyethane (DME), 1,2-diethoxyethane (DEE), and ethoxymethoxyethane (EME); cyclic ethers such as tetrahydrofuran and 2-methyltetrahydrofuran; and dimethyl sulfoxide, 1,3-dioxolane, formamide, acetamide, dimethylformamide, dioxolane, acetonitrile, propionitrile, nitromethane, ethyl monoglyme, trimethoxymethane, sulfolane, methylsulfolane, and 1,3-propanesultone. They may be used alone or in combination of two or more.

An ionic liquid can also be used as the nonaqueous solvent used for LICs. The ionic liquid is a liquid salt at ordinary temperature. For example, a salt of an onium ion (cation) selected from the foregoing and an imide ion or a sulfonate ion (anion) is preferably used as the ionic liquid. The onium ion is preferably, for example, an ion having an imidazolium skeleton, an imidazolinium skeleton, a pyridinium skeleton, a pyrrolidinium skeleton, or the like.

More specifically, the ionic liquid preferably contains, as a cation, at least one selected from the group consisting of a 1-ethyl-3-methyl imidazolium ion ($EMI^+$) and an N-methyl-N-propyl pyrrolidinium ion ($MPPY^+$) and contains, as an anion, at least one selected from the group consisting of a bis(fluorosulfonyl)imide ion ($N(SO_2F)_2^-$), a bis(trifluoromethanesulfonyl)imide ion ($N(SO_2CF_3)_2^-$), a bis(pentafluoroethanesulfonyl)imide ion ($N(SO_2C_2F_5)_2^-$), and a trifluoromethanesulfonate ion ($CF_3SO_3^-$). Among them, a 1-ethyl-3-methyl imidazolium ion ($EMI^+$) is particularly preferred as a cation because of its excellent ionic conductivity. A bis(fluorosulfonyl)imide ion ($FSI^-$) or a bis(trifluoromethanesulfonyl)imide ion ($TFSI^-$) is particularly preferred as an anion.

A specific composition of the nonaqueous electrolyte that uses the ionic liquid is, for example, a mixture of a salt of $EMI^+$ and $FSI^-$ (EMI-FSI) and lithium bis(fluorosulfonyl) imide (LiFSI). Such a composition is believed to have compatibility with the porous carbon material generated by chlorinating a metal carbide. In the mixture of EMI-FSI and LiFSI, the content of LiFSI is desirably 5 mol % to 30 mol %. This composition is advantageous to achieving both excellent ionic conductivity and excellent permeability of the electrolyte into the electrode.

[Separator]

A separator that prevents a short-circuit by physically separating electrodes and has ionic permeability can be disposed between a pair of electrodes or between a positive electrode and a negative electrode. The separator has a porous structure and retains an electrolyte in pores, which achieves permeation of ions. The separator can be made of, for example, polyolefin, polyethylene terephthalate, polyamide, polyimide, cellulose, or glass fiber.

Figure 9:
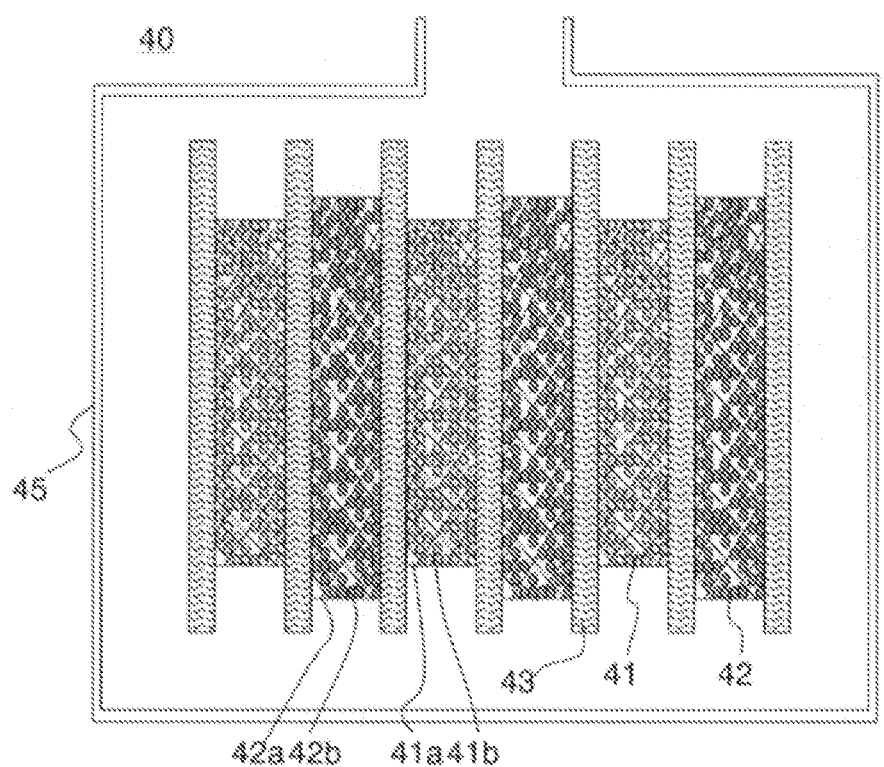
FIG. 9 is a sectional view illustrating a structure of an example of a capacitor.

FIG. 9 schematically illustrates a structure of an example of a capacitor. A group of plates and an electrolyte, which are main components of a capacitor 40, are accommodated in a cell case 45. The group of plates is constituted by stacking a plurality of first electrodes (positive electrodes) 41 and a plurality of second electrodes (negative electrodes) 42 with separators 43 disposed therebetween. Each of the first electrodes 41 includes a first electrode current collector 41a having a three-dimensional network structure and a particulate first electrode active material 41b that fills communicating pores of the first electrode current collector 41a. Each of the second electrodes 42 includes a second electrode current collector 42a having a three-dimensional network structure and a particulate second electrode active material 42b that fills communicating pores of the second electrode current collector 42a. Herein, the group of plates is not limited to the stacked structure, but may be constituted by winding the first electrode 41 and the second electrode 42 with the separator 43 disposed therebetween.

When the capacitor 40 is an LIC, the size of the negative electrode 42 is desirably set to be larger than that of the positive electrode 41 as illustrated in FIG. 9 in order to prevent lithium from precipitating on the negative electrode 42.

Next, an example of a method for industrially producing a porous carbon material will be described in detail.

The porous carbon material can be efficiently produced in an industrial scale by, for example, a production method including (i) a step of generating a porous carbon material and a first metal chloride by heating a first metal carbide in an atmosphere containing chlorine gas, (ii) a step of generating a first metal and a second metal chloride by reducing the first metal chloride through the reaction with a second metal, (iii) a step of generating the first metal carbide by reacting the first metal with carbon, and (iv) a step of generating a second metal and chlorine gas by reducing the second metal chloride. The order of the step (iii) and the step (iv) is not particularly limited. Either of the step (iii) or the step (iv) may be performed first or both the step (iii) and the step (iv) may be simultaneously performed.

In the above production method, in the step (i), a first metal carbide (e.g., SiC, TiC) and chlorine gas ($Cl_2$) are reacted with each other to generate a porous carbon material and a first metal chloride (e.g., $SiCl_4$, $TiCl_4$). The generated first metal chloride is reduced in the step (ii) to extract a first metal (e.g., Si, Ti). The extracted first metal is carbonized in the step (iii) to regenerate the first metal carbide (e.g., SiC, TiC). The regenerated first metal carbide is reused in the step (i). In the step (ii), a second metal chloride (e.g., $ZnCl_2$, $MgCl_2$) is generated. The generated second metal chloride is reduced in the step (iv) to regenerate a second metal (e.g., Zn, Mg) and chlorine gas ($Cl_2$). The regenerated second metal is reused in the step (ii), and the regenerated chlorine gas is reused in the step (i). As described above, the materials other than carbon used in the step (iii) are all reused. Therefore, according to the above production method, the environmental load is reduced and the production cost can be decreased.

The first metal carbide to be reacted with chlorine gas is, for example, in the form of powder or a porous body. Thus, a porous carbon material can be efficiently extracted from the first metal carbide.

The first metal carbide may be, for example, at least one selected from the group consisting of SiC and TiC. However, it is believed that the raw material for the porous carbon material in which the X-ray diffraction image has a peak attributed to the (111) plane of diamond is most preferably SiC. If a porous carbon material having a desired X-ray diffraction image can be generated by, for example, improving the production conditions, other metal carbides may be used. Examples of the other metal carbides include $Al_4C_3$, $ThC_2$, $B_4C$, $CaC_2$, $Cr_3C_2$, $Fe_3C$, $UC_2$, WC, and MoC. They may be used alone or in combination of two or more.

The atmosphere containing chlorine gas may be an atmosphere containing only chlorine gas. However, the atmosphere may be a mixture gas atmosphere containing chlorine gas and inert gas. This can improve the safety of a production facility at which the step (i) is performed and can also suppress the degradation of the production facility.

The heating temperature at which the first metal carbide is reacted with the chlorine gas is preferably 1100° C. or higher and 1500° C. or lower as described above and is more preferably, for example, 1100° C. to 1400° C. As a result, the reaction efficiency between the first metal carbide and the chlorine gas can be improved, and a porous carbon material having a desired X-ray diffraction image and a large specific surface area can be efficiently obtained.

The second metal may be, for example, at least one selected from the group consisting of group 1 elements, group 2 elements, group 11 elements, and group 12 elements. Thus, the reduction reaction of the first metal chloride can be efficiently caused to proceed.

Hereafter, a method for producing a porous carbon material will be described in detail with reference to the attached drawings. In the description of the drawings, the same elements are designated by the same reference numerals, and the description therefor is omitted to avoid redundancy.

Figure 10:
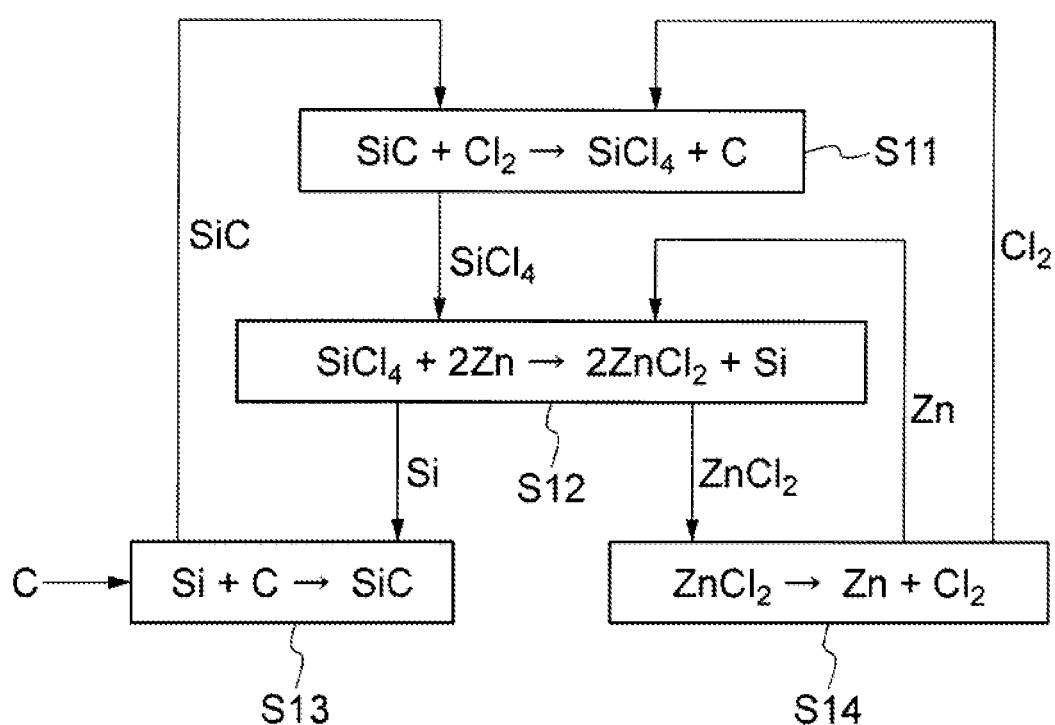
FIG. 10 is a flowchart showing flows of steps of an example of a method for producing a porous carbon material.

FIG. 10 is a flowchart showing flows of steps of an example of the method for producing a porous carbon material. Herein, SiC is used as the first metal carbide and zinc (Zn) is used as the second metal. As shown in FIG. 10, this production method includes a step (i) (S11) of generating a porous carbon material, a step (ii) (S12) of reducing a first metal chloride, a step (iii) (S13) of regenerating a first metal carbide, and a step (iv) (S14) of reducing a second metal chloride. These steps are repeatedly performed. Thus, a porous carbon material derived from SiC can be continuously produced.

The step (i) is a step in which a first metal carbide and chlorine gas are heat-treated while being in contact with each other. In this step, only a first metal contained in the crystals of the first metal carbide reacts with chlorine gas, only the first metal is released from the crystals, and a carbon material having a porous structure is formed. This step is performed in an atmosphere containing chlorine gas. The atmosphere containing chlorine gas may be a substantially 100% chlorine gas atmosphere or a mixture gas atmosphere containing chlorine gas and inert gas (e.g., $N_2$, He, Ar, Ne, Xe). The mixing ratio of chlorine gas to inert gas (chlorine gas:inert gas) is preferably 1:50 to 1:1 in terms of flow ratio.

In the step (i), a porous carbon material and a first metal chloride (e.g., $SiCl_4$) are obtained. The first metal chloride is cooled to a temperature lower than or equal to the boiling point of the chloride with a cooler, and then recovered.

In the step (i), a metal carbide in the form of powder or a porous body is preferably used. This is because a first metal located at a position deeper from the surface of the metal carbide requires a longer time until the first metal is released in the form of a chloride. By using a metal carbide in the form of powder or a porous body with a large surface area, the first metal can be efficiently released from the metal carbide. Therefore, the time required to produce the porous carbon material can be shortened. The average particle diameter of the metal carbide is preferably 0.1 µm to 100 µm and more preferably 2 µm to 40 µm. By controlling the particle diameter of the metal carbide in advance so that the metal carbide has such an average particle diameter, a porous carbon material having a sharp distribution and a large total pore volume per unit mass can be easily obtained. It is also effective that a raw material having several average particle diameters is used to increase the packing density of powder.

After the step (i), the first metal chloride is reduced (step (ii)). A second metal which is more easily oxidized than the first metal is used as a reducing agent. Thus, a high-purity first metal can be extracted from the first metal chloride. The second metal is preferably a group 1 element (group 1A element, alkali metal), a group 2 element (group 2A element, alkaline-earth metal), a group 11 element (group 1B element) such as Cu, a group 12 element (group 2B element) such as Zn, or the like. They may be used alone or in combination of two or more. Among them, Zn is desirably used because the melting point of the chloride is relatively low and the vapor pressure is high. That is, a so-called zinc reduction method is preferably employed in the step (ii). In addition to Zn, for example, Mg, Na, K, Sr, Ba, and Ca are also suitable as the second metal.

Subsequently, the first metal generated in the step (ii) is carbonized (step (iii)) and the second metal chloride is reduced (step (iv)). In the step (iii), the first metal is reacted with carbon to regenerate the metal carbide. A carbon raw material used for the carbonization may be a material easily available at low cost, such as carbon black or natural graphite. The regenerated metal carbide is reused in the step (i).

In the step (iv), the second metal chloride is electrolyzed to obtain a second metal and chlorine gas. Specifically, the second metal chloride is electrolyzed in a high-temperature molten state to separate the second metal chloride into a second metal and chlorine gas. The resulting chlorine gas is reused in the step (i). The resulting second metal is reused in the step (ii).

Figure 11:
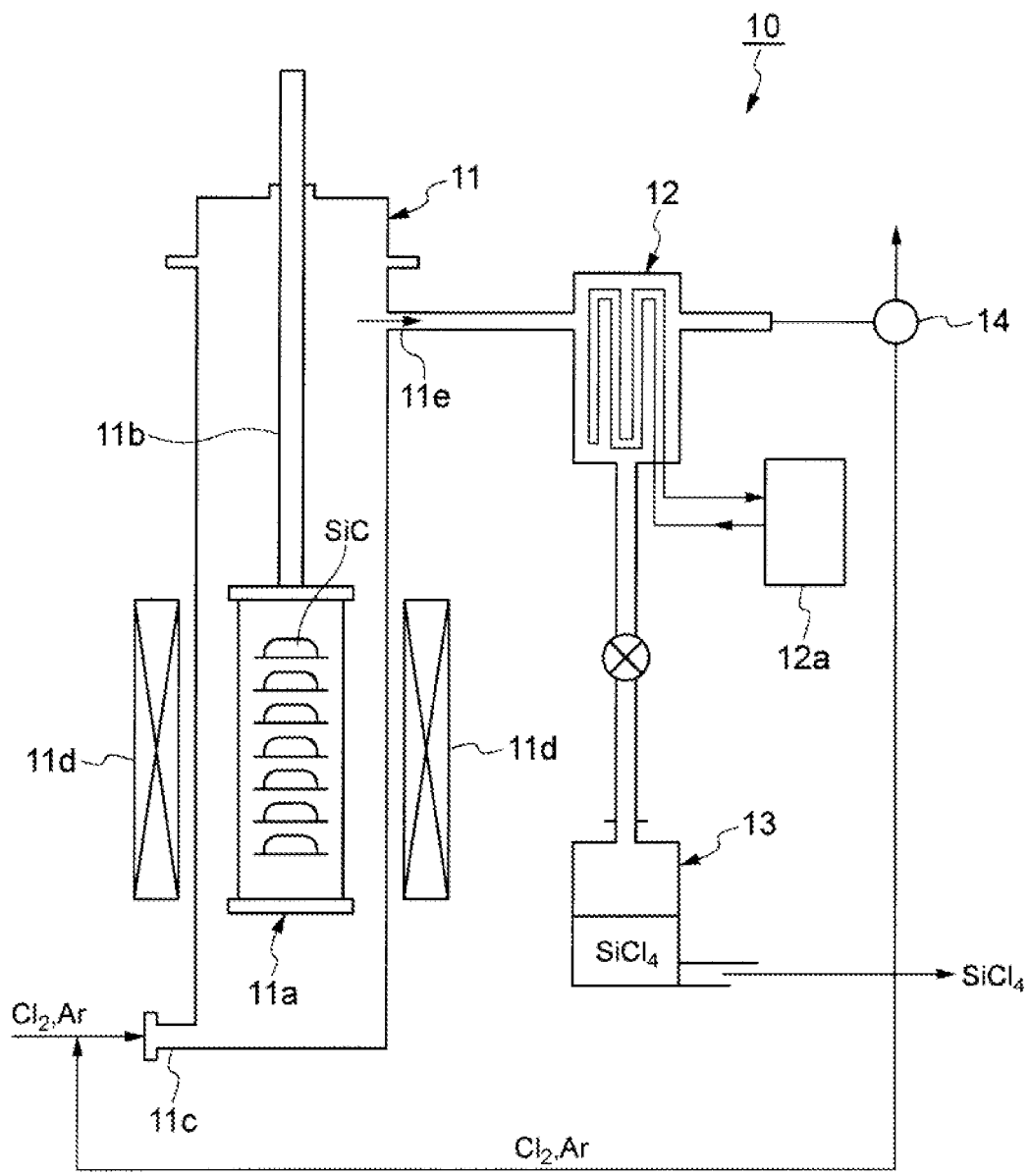
FIG. 11 schematically illustrates a structure of a carbon generator for generating a porous carbon material.
Figure 12:
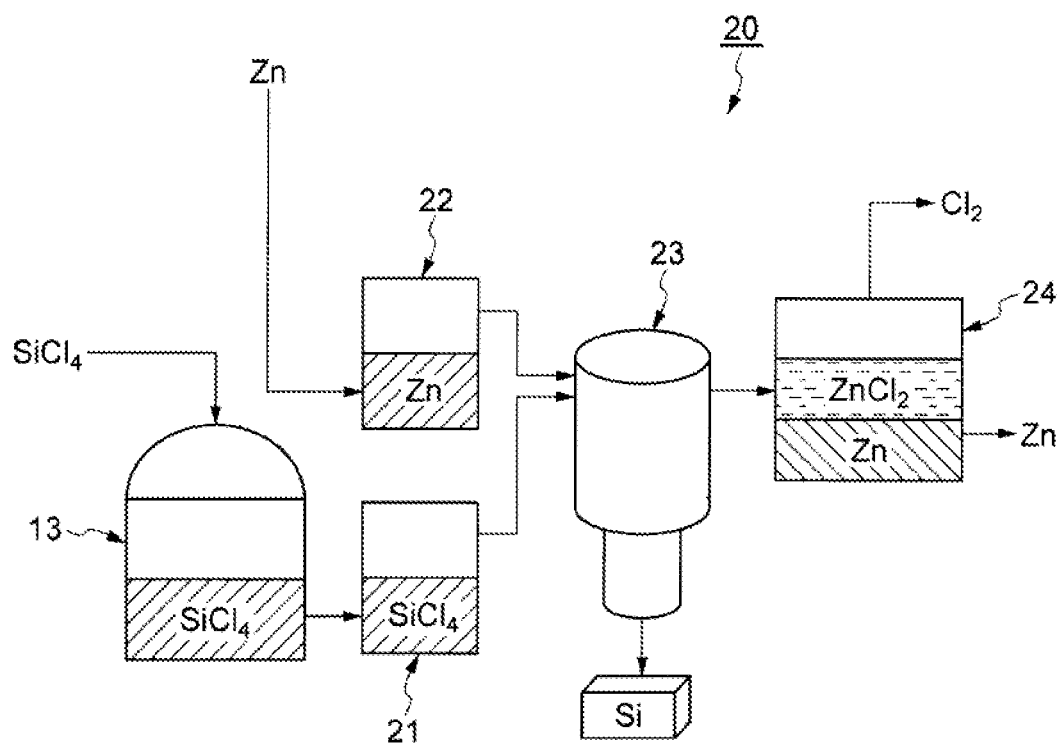
FIG. 12 illustrates a simplified structure of a zinc reduction apparatus used in a step of reducing a metal chloride which is generated when a porous carbon material is generated.
Figure 13:
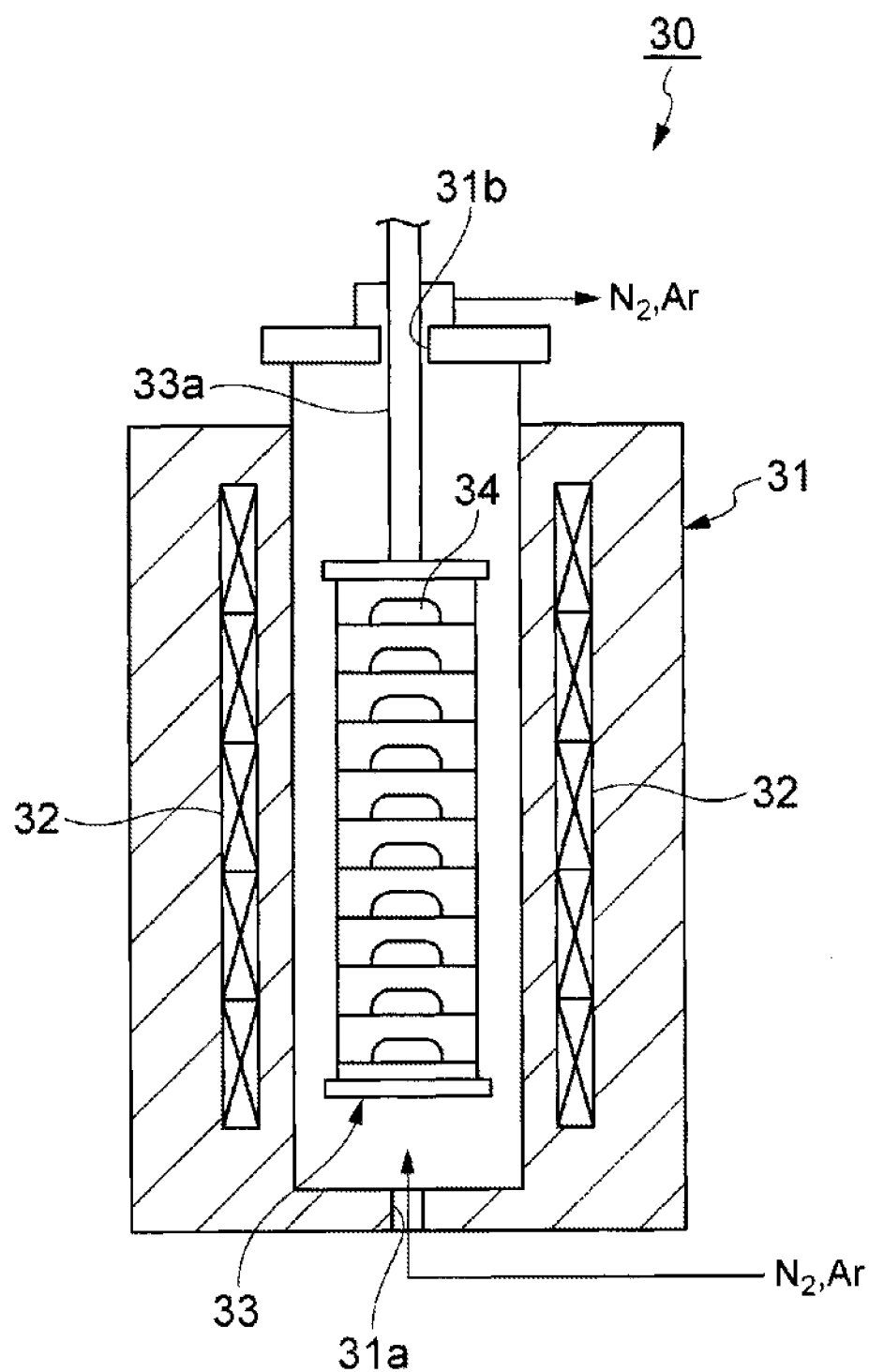
FIG. 13 schematically illustrates a structure of a carbide generator for generating a metal carbide.

Next, an example of a carbon production apparatus for generating a porous carbon material will be described. FIG. 11 schematically illustrates a structure of a carbon generator 10. FIG. 12 illustrates a simplified structure of a zinc reduction apparatus 20 used in the step (ii) and step (iv). FIG. 13 schematically illustrates a structure of a carbide generator 30 used in the step (iii).

Referring to FIG. 11, the carbon generator 10 includes a reactor 11, a cold trap 12, and a storage tank 13. The reactor 11 includes a placement shelf 11a on which a metal carbide is placed in multiple tiers. The placement shelf 11a is supported by a supporting rod 11b so as to be hung down. A gas inlet 11c is disposed in a portion below the placement shelf 11a in the reactor 11. A mixture gas containing chlorine gas and inert gas or substantially 100% chlorine gas is introduced into the reactor 11 from the gas inlet 11c. A heater 11d is disposed outside the reactor 11 so as to surround the placement shelf 11a. The mixture gas or the chlorine gas around the metal carbide is heated to a predetermined temperature of 1100° C. or higher and 1500° C. or lower with the heater 11d.

In the reactor 11, a first metal is released from the metal carbide, and a porous carbon material is generated on the placement shelf 11a. A first metal chloride generated as a result of the reaction and the mixture gas (or chlorine gas) are discharged through a gas outlet 11e disposed in an upper portion of the reactor 11 to the outside of the reactor 11. The gas outlet 11e is connected to the cold trap 12, and the discharged gas from the reactor 11 is cooled with a coolant 12a circulated in the cold trap 12. The cooled first metal chloride is stored in the storage tank 13, and then sent to the zinc reduction apparatus 20. The mixture gas (or chlorine gas) that has passed through the cold trap 12 is discharged to the outside of the carbon generator 10 or sent to the gas inlet 11c of the reactor 11 again through a three-way valve 14.

Referring to FIG. 12, the zinc reduction apparatus 20 includes vaporizers 21 and 22, a reactor 23, and a molten salt electrolytic cell 24. The first metal chloride stored in the storage tank 13 of the carbon generator 10 is sent to the vaporizer 21 and vaporized. In the vaporizer 22, the second metal is vaporized. The thus-vaporized first metal chloride and second metal are sent to the reactor 23. In the reactor 23, the first metal chloride and the second metal are reacted with each other at high temperature to extract a first metal and to generate a second metal chloride. The second metal chloride is sent to the molten salt electrolytic cell 24 and separated into the second metal and the chlorine gas by electrolysis. The thus-extracted chlorine gas is sent to the carbon generator 10, and the second metal is sent to the vaporizer 22.

Referring to FIG. 13, the carbide generator 30 includes a reactor 31 that extends in a vertical direction, a heater 32 embedded in the side wall of the reactor 31, and a placement shelf 33 disposed in the reactor 31. On the placement shelf 33, a mixture 34 of a first metal and a carbon raw material (carbon black or natural graphite) is placed in multiple tiers. The placement shelf 33 is supported by a supporting rod 33a so as to be hung down.

An inlet 31a is disposed in a lower portion of the reactor 31, and an inert gas (e.g., $N_2$, He, Ar, Ne, Xe) is introduced from the inlet 31a. The inert gas moves upward in the reactor 31, and is then discharged through a gas outlet 31b disposed in an upper portion of the reactor 31.

The heater 32 is disposed so as to surround the placement shelf 33 and is used to heat the mixture 34 placed on the placement shelf 33. In this process, the appropriate temperature of the mixture 34 is 1400° C. to 1800° C. Thus, the first metal and carbon are bonded to each other to regenerate the metal carbide.

In the above-described production method and production apparatus, the materials, other than the carbon raw material, used for generating the porous carbon material are all reused through circulation. Therefore, it is obvious that the environmental load is reduced and the production cost can be decreased.

Example 1

(i) Synthesis of SiC

A mixture of activated carbon (average particle diameter: 20 μm, specific surface area: 80 m²/g) and silicon particles (average particle diameter: 100 μm) was placed on a placement shelf made of carbon, and the placement shelf was inserted into a reactor with a temperature of 900° C. and a nitrogen gas atmosphere. The temperature in the reactor was then increased to 1450° C. at a heating rate of 10° C./min to melt silicon. In that state, the activated carbon and the silicon were reacted with each other for 5 hours. The resulting product was β-type SiC. The SiC was crushed until the average particle diameter of the SiC reached 10 μm.

(ii) Generation of Porous Carbon Material

The SiC having an average particle diameter of 10 μm was placed on a placement shelf made of carbon in an electric furnace including a furnace tube made of quartz glass. Then, chlorine gas was caused to flow into the electric furnace at a flow rate of 1000 ml/min, and Ar gas was caused to flow into the electric furnace at a flow rate of 5000 ml/min. Thus, the SiC and the chlorine gas were reacted with each other at 1100° C. for two hours. A cold trap at −20° C. was disposed at a gas outlet of the furnace tube, and $SiCl_4$ was liquefied with the cold trap and recovered. Furthermore, chlorine gas that was not reacted with the SiC in the furnace tube was refluxed to the furnace tube with a three-way valve disposed on the outlet side of the cold trap. Subsequently, the chlorine gas in the furnace tube was removed with Ar gas. The temperature of the placement shelf made of carbon was decreased to 400° C., and then a porous carbon material left on the placement shelf was taken out into the air.

(iii) Evaluation of Physical Properties of Porous Carbon Material (a) XRD

An X-ray diffraction image of the porous carbon material with CuKα rays was measured, and a diffraction image illustrated in FIG. 1 was obtained. A peak attributed to the (002) plane of graphite was not observed at all at 2θ=20° to 30° ($I_{G002}/I_k$=0). On the other hand, a broad peak $P_{d111}$ attributed to the (111) plane of diamond was observed at 2θ=40° to 50°. The size of a crystallite determined using the Scherrer equation from the half peak width of $P_{d111}$ was 2.0 nm.

(b) Observation with Electron Microscope

A section of the porous carbon material was polished, and then observed with a high-resolution TEM. Consequently, the presence of microcrystals having an onion-like structure with a diameter of about 2 nm was confirmed as illustrated in FIG. 2.

(c) Pore Diameter Distribution

The pore diameter distribution of the porous carbon material was determined by measuring the isotherm adsorption amount of $N_2$ at −196° C. (with BELLSORP-miniII manufactured by Bel Japan, Inc.). As illustrated in FIG. 6, a sharp distribution having a peak at 0.32 nm was obtained. The cumulative volume of pores having a pore diameter of 1 nm or less was 90% of the total pore volume.

(d) Impurity Concentration

The composition of the porous carbon material was analyzed by an inductively coupled plasma method. A transition metal element and an alkali metal element were not detected as impurities (the detection limit of the analysis was 10 ppm). The amount of hydrogen desorbed was measured with a gas chromatography-mass spectrometer while the temperature was increased to 800° C. As a result, the hydrogen content was 50 ppm.

(e) BET Specific Surface Area

The BET specific surface area of the porous carbon material was determined by measuring the isotherm adsorption amount of $N_2$ (BELLSORP-miniII manufactured by Bel Japan, Inc.). The BET specific surface area was 1250 m²/g.

(iv) Production of Electrode for Capacitor

An aluminum porous body having an average cell size of 550 μm, a weight per unit area of 150 g/m², and a thickness of 1000 μm was prepared as an electrode current collector. To 100 parts by mass of the porous carbon material (average particle diameter: about 10 μm), 2 parts by mass of Ketjenblack serving as a conductive aid, 4 parts by mass of a polyvinylidene fluoride powder serving as a binder, and 15 parts by mass of N-methyl-2-pyrrolidone (NMP) serving as a dispersion medium were added. The mixture was stirred with a mixer to prepare an electrode slurry. The current collector was filled with the resulting slurry, dried, and rolled with a roller to obtain an electrode having a thickness of 480 μm.

(v) Preparation of Electrolyte

TEMA-$BF_4$ was dissolved in propylene carbonate serving as a nonaqueous solvent so as to have a concentration of 1.5 mol/L, which was used as an electrolyte.

(vi) Production of Cell

A separator made of cellulose and having a thickness of 60 μm was disposed between a pair of electrodes to form a group of plates. The group of plates and the electrolyte were then accommodated in an aluminum laminated bag to complete an EDLC with a nominal capacitance of 10 F.

[Evaluation of Capacitor]

For the produced EDLC, the capacitance per 1 g of the porous carbon material was determined in the voltage range of 0.0 V to 3.6 V. The capacitance was 50 F/g.

Subsequently, after a charge-discharge cycle was repeatedly performed 5000 times, the capacitance retention ratio based on the initial capacitance was measured. The capacitance retention ratio was 98%.

Example 2

A porous carbon material was generated in the same manner as in Example 1, except that TiC was used instead of SiC. The X-ray diffraction image of the resulting porous carbon material had a broad peak attributed to the (002) plane of graphite at 2θ=20° to 30° as in the waveform Y of FIG. 3. A broad peak $P_k$ was also observed at 2θ=40° to 50°. Herein, $I_{G002}/I_k$ was 2.7, and most of $P_k$ was assumed to be a component of $P_{d111}$. The size of a crystallite determined using the Scherrer equation from the half peak width of $P_k$ was 1.9 nm.

The pore diameter distribution of the porous carbon material was determined in the same manner as in Example 1. Consequently, a sharp distribution having a peak at 0.4 nm was obtained. The cumulative volume of pores having a pore diameter of 1 nm or less was 93% of the total pore volume. The composition of the porous carbon material was analyzed by inductively coupled plasma emission spectrometry. A transition metal element and an alkali metal element were not detected as impurities. The hydrogen content was 10 ppm. Furthermore, the BET specific surface area of the porous carbon material was measured in the same manner as in Example 1. The BET specific surface area was 1500 m²/g.

The capacitor of Example 2 was evaluated in the same manner as in Example 1. The capacitance per 1 g of activated carbon was 51 F/g, and the capacitance retention ratio was 97%.

Comparative Example 1

A capacitor was produced in the same manner as in Example 1, except that an activated carbon having a BET specific surface area of 2100 m²/g and an average particle diameter of 10 μm was used instead of the porous carbon material derived from SiC used in Example 1. The pore diameter distribution of the activated carbon was measured, and a peak was observed at 1.9 nm.

The capacitor of Comparative Example 1 was evaluated in the same manner as in Example 1. The capacitance per 1 g of activated carbon was 30 F/g, and the capacitance retention ratio was 93%.

Comparative Example 2

A capacitor was produced in the same manner as in Example 1, except that a carbon nanotube (CNT) having a BET specific surface area of 600 m²/g was used instead of the porous carbon material derived from SiC used in Example 1.

The capacitor of Comparative Example 2 was evaluated in the same manner as in Example 1. The capacitance per 1 g of CNT was 2 F/g, and the capacitance retention ratio was 94%.

Comparative Example 3

A porous carbon material was generated in the same manner as in Example 1, except that $Al_4C_3$ was used instead of SiC. The X-ray diffraction image of the resulting porous carbon material had a peak attributed to the (002) plane of graphite at 2θ=20° to 30° as in the waveform Z of FIG. 3. A broad peak $P_k$ was also observed at 2θ=40° to 50°. Herein, $I_{G002}/I_k$ was 4.3, and it is assumed that $P_k$ practically does not include a component of $P_{d111}$.

The pore diameter distribution of the porous carbon material was determined in the same manner as in Example 1. Consequently, a sharp distribution having a peak at 1.5 nm was obtained. The cumulative volume of pores having a pore diameter of 1 nm or less was 55% of the total pore volume. The composition of the porous carbon material was analyzed by inductively coupled plasma emission spectrometry. A transition metal element and an alkali metal element were not detected as impurities. Furthermore, the BET specific surface area of the porous carbon material was measured in the same manner as in Example 1. The BET specific surface area was 1120 m²/g.

The capacitor of Comparative Example 3 was evaluated in the same manner as in Example 1. The capacitance per 1 g of porous carbon material was 36 F/g, and the capacitance retention ratio was 92%.

INDUSTRIAL APPLICABILITY

The electrode active material for capacitors according to the present invention can be used for various capacitors such as EDLCs and LICs. Furthermore, the capacitor according to the present invention has a low electrical resistance and excellent cycle characteristics and thus is promising for power supplies of, for example, electric vehicles and hybrid cars.

REFERENCE SIGNS LIST 10 carbon generator
11 reactor
12 cold trap
13 storage tank
14 three-way valve
20 zinc reduction apparatus
21, 22 vaporizer
23 reactor
24 molten salt electrolytic cell
30 carbide generator
31 reactor
32 heater
33 placement shelf
34 mixture
40 capacitor
41 first electrode (positive electrode)
42 second electrode (negative electrode)
43 separator
45 cell case

The invention claimed is:

1. An electrode active material for capacitors, comprising:
a porous carbon material,
wherein the porous carbon material has a BET specific surface area of 800 m²/g or more,
an X-ray diffraction image of the porous carbon material with CuKα rays has a peak $P_k$ at 2θ=40° to 50°, and the peak $P_k$ includes a component of a peak $P_{d111}$ attributed to a (111) plane of diamond crystals, and
when the X-ray diffraction image has a peak $P_{G002}$ attributed to a (002) plane of graphite, a ratio of an intensity $I_{G002}$ of $P_{G002}$ to an intensity $I_k$ of $P_k$ ($I_{G002}/I_k$) is 3.0 or less.

2. The electrode active material for capacitors according to claim 1, wherein $P_k$ is located at an angle higher than 2θ=43°.

3. The electrode active material for capacitors according to claim 1, wherein an intensity at 2θ=10° is three times or more an intensity of $P_k$.

4. The electrode active material for capacitors according to claim 1, wherein a size of a crystallite determined from a half peak width of $P_k$ is 1.0 nm to 10.0 nm.

5. The electrode active material for capacitors according to claim 1, wherein in a volume-based pore diameter distribution of the porous carbon material, a cumulative volume of pores having a pore diameter of 1 nm or less is 80% or more of a total pore volume.

6. The electrode active material for capacitors according to claim 1, wherein a content of an alkali metal element in the porous carbon material is 0 ppm to 400 ppm.

7. The electrode active material for capacitors according to claim 1, wherein a content of hydrogen in the porous carbon material is 0 ppm to 100 ppm.

8. A capacitor comprising a first electrode, a second electrode, a separator disposed between the first electrode and the second electrode, and an electrolyte,
wherein at least one of the first electrode and the second electrode contains the electrode active material for capacitors according to claim 1.

9. The capacitor according to claim 8, wherein the electrolyte contains, as a cation, at least one selected from the group consisting of a lithium ion ($Li^+$), a tetraethylammonium ion ($TEA^+$), a triethylmonomethylammonium ion ($TEMA^+$), a 1-ethyl-3-methyl imidazolium ion ($EMI^+$), and an N-methyl-N-propyl pyrrolidinium ion ($MPPY^+$) and
contains, as an anion, at least one selected from the group consisting of a hexafluorophosphate ion ($PF_6^-$), a perchlorate ion ($ClO_4^-$), a tetrafluoroborate ion ($BF_4^-$), a bis(oxalato)borate ion ($BC_4O_8^-$), a bis(fluorosulfonyl) imide ion ($N(SO_2F)_2^-$), a bis(trifluoromethanesulfonyl) imide ion ($N(SO_2CF_3)_2^-$), a bis(pentafluoroethanesulfonyl)imide ion ($N(SO_2C_2F_5)_2^-$), and a trifluoromethanesulfonate ion ($CF_3SO_3^-$).

10. A lithium ion capacitor comprising a positive electrode, a negative electrode, a separator disposed between the positive electrode and the negative electrode, and a lithium ion conductive nonaqueous electrolyte,
wherein at least one of the positive electrode and the negative electrode contains the electrode active material for capacitors according to claim 1.

11. The lithium ion capacitor according to claim 10, wherein the nonaqueous electrolyte contains a nonaqueous solvent and a lithium salt soluble in the nonaqueous solvent, and the nonaqueous solvent is an ionic liquid or an organic solvent.

12. The lithium ion capacitor according to claim 11, wherein the ionic liquid contains, as a cation, at least one selected from the group consisting of a 1-ethyl-3-methyl imidazolium ion ($EMI^+$) and an N-methyl-N-propyl pyrrolidinium ion ($MPPY^+$) and contains, as an anion, at least one selected from the group consisting of a bis(fluorosulfonyl) imide ion ($N(SO_2F)_2^-$), a bis(trifluoromethanesulfonyl)imide ion ($N(SO_2CF_3)_2^-$), a bis(pentafluoroethanesulfonyl) imide ion ($N(SO_2C_2F_5)_2^-$), and a trifluoromethanesulfonate ion ($CF_3SO_3^-$).

* * * * *